United States Patent [19]

Wozniak et al.

[11] Patent Number: 4,762,301

[45] Date of Patent: Aug. 9, 1988

[54] COMPACT MULTI-SERVICE BALL VALVE

[75] Inventors: Richard F. Wozniak, Euclid; Robert C. Stewart, Bedford Heights.; Peter C. Williams, Clevelands Heights, all of Ohio

[73] Assignee: Whitey Co., Highland Heights, Ohio

[21] Appl. No.: 11,753

[22] Filed: Feb. 6, 1987

[51] Int. Cl.[4] .................................................. F16K 5/06
[52] U.S. Cl. .................................... 251/171; 251/214; 251/315
[58] Field of Search ................... 251/84, 171, 174, 214, 251/367, 175, 363, 315

[56] References Cited

U.S. PATENT DOCUMENTS

| 3,472,270 | 10/1969 | Masheder | 251/174 X |
|---|---|---|---|
| 3,508,738 | 4/1970 | Athinion et al. | 251/315 |
| 3,656,711 | 4/1972 | Toelke | 251/174 X |
| 3,678,956 | 7/1972 | Ebiu | 251/174 X |
| 4,479,513 | 10/1984 | Koch | 251/214 X |
| 4,548,385 | 10/1985 | Barbuto | 251/175 |
| 4,580,763 | 4/1986 | Velam | 251/171 |
| 4,684,105 | 8/1987 | Haas, II | 251/315 X |

FOREIGN PATENT DOCUMENTS 1151417 12/1954 Fed. Rep. of Germany ...... 251/174

Primary Examiner—A. Michael Chambers
Assistant Examiner—John C. Fox
Attorney, Agent, or Firm—Fay, Sharpe, Beall, Fagan, Minnich & McKee

[57] ABSTRACT

A ball valve having a two component body with a bonnet section formed integrally with one of the body components. A first body member defines a first flow passage and a first end of a valve chamber. The second body member forms a second flow passage and a second end of the valve chamber. Formed about the first flow passage is a first sleeve member which extends axially into the valve chamber. A cylindrical stem receiving chamber is also formed in the first body member and extends radially outwardly from the valve chamber to open to the exterior of the first body member through an inwardly facing shoulder. Inner and outer radially spaced sleeves are formed integrally with the second body member and extend into the valve chamber circumferentially about the second flow passage. The inner sleeve is aligned with the first sleeve member formed about the first flow passage on the first body member. A valve ball is mounted in the chamber in axial alignment with the first and second flow passages. Seat rings are positioned about the first and second sleeve members and biased into engagement with the valve ball. An operating stem is provided for rotating the ball. The operating stem is positioned axially of the stem receiving chamber and has a pair of spaced, outwardly extending integral flanges located axially inwardly of the shoulder. Stem seal means are located between the pair of flanges and a resilient bearing ring is located between said shoulder and the outermost flange of said pair of flanges.

8 Claims, 2 Drawing Sheets

COMPACT MULTI-SERVICE BALL VALVE

BACKGROUND OF THE INVENTION

The subject invention is directed toward the valve art and, more particularly, to an improved ball valve.

The invention is especially suited for small, compact multi-service ball valves; however, as will become apparent, the invention could be incorporated in valves of many sizes or in special service valves. The manufacture of ball valve bodies or housings often requires a significant amount of relatively complex machining whether the bodies are formed from bar stock, forged or cast. To simplify the machining without seriously affecting the performance of the valves, the housings have often been designed as multi-part assemblies having separate bonnet components and threadedly attached end pieces. In addition, to simplify the internal machining the valves have often been provided with separate inserts or sleeve-like members for carrying the ball seal and body seal elements. Consequently, the resulting valves have often been relatively complex and/or a compromise in design.

The above discussed manufacturing and design problems are amplified for smaller sized ball valves such as those for process and instrumentation purposes. Also, the designs available often do not assure that the stems, seat and/or balls will be blowout proof.

BRIEF DESCRIPTION OF THE INVENTION

The subject invention provides an extremely rugged design which is especially suited for use in small size ball valves. The design is relatively simple and offers advantages for valves used in high pressure service since both the ball and the operating stem are blowout proof.

In particular, in accordance with one aspect, the invention comprises a ball valve including a first unitary body member having first and second axially disposed ends with a cylindrical valve chamber extending inwardly from the first end and terminating in a transversely extending end face. A first flow passage extends into the first body member from the second end to open into the valve chamber axially of the end face. Formed about the first flow passaage is a first sleeve member extending axially into the valve chamber. A cylindrical stem receiving chamber is also formed in the first body member and extends radially outwardly from the valve chamber to open to the exterior of the first body member through an inwardly facing shoulder. A second unitary body member is releasably connected to the first end of the first body member to close the first end of the valve chamber and define a second flow passage opening into the valve chamber in axial alignment with the first flow passge. Inner and outer radially spaced sleeves are formed integrally with the second body member and extend into the valve chamber circumferentially about the second flow passage. The inner sleeve is aligned with the first sleeve member formed about the first flow passage on the first body member. Mounted in the valve chamber is a valve ball axially aligned with the first and second flow passages. Seat rings are positioned about the first and inner sleeve members and biased into engagement with the valve ball. An operating stem is provided for rotating the ball. The operating stem is positioned axially of the stem receiving chamber and has a pair of spaced outwardly extending integral flanges located axially inwardly of the shoulder. Stem seal means are located between the pair of flanges and a resilient bearing ring is located between said shoulder and the outermost flange of said pair of flanges.

The design of the stem receiving opening with its integral flange and the relationship of the stem flanges and stem bearing are such that the stem is blowout proof. In addition, the stem bearing surfaces are sealed from the interior of the valve chamber so that the bearing surfaces are non-wetted.

In accordance with another more limited aspect of the invention, the valve chamber has an enlarged counterbore formed at the first end thereof. The counterbore is sized to receive the outer sleeve of the second body member and define an annular space between the outer sleeve and the first body member. In addition, the inner diameter of the outer sleeve substantially corresponds to the diameter of the valve chamber to provide a continuation of the valve chamber and define an annular seat ring receiving opening which is aligned with a corresponding annular seat ring receiving opening around the first sleeve member.

In accordance with a further aspect of the invention, seat ring assemblies are positioned in each annular recess. Each ring seat ring assembly comprises a resilient O-ring member closely surrounding the associated sleeve member and engaging an associated end wall of the valve chamber. A seat ring is closely but slidably received in each annular recess and has a first end engaged with the associated O-ring and a second end extending out of the associated recess for sealing engagement with the ball member. The first end of each seat ring preferably includes integrally formed inner and outer continuous walls or lips which extend axially into the associated recess on radially opposite sides of the associated O-ring. The O-rings are sized to be received within the continuous walls or lips and to maintain their associated seat ring compressively engaged with the ball member throughout a portion of the range of axial movement of the ball member. The O-rings are sized relative to the associated recess and the seat ring to limit axial movement of the ball member toward the sleeve members to prevent the ball member from engaging the sleeve members under even extremely high pressure conditions. In addition, the continuous lips confine the O-ring and prevent O-ring extrusion under high pressure conditions.

In operation, the O-rings act to maintain sufficient preload on the seat rings to seal with the ball under low line pressure. However, as line pressure increases the ball moves toward the downstream seat causing increased sealing pressure between the ball and the downstream seat ring. The downstream seat ring does, however, have some freedom to move against its respective biasing O-ring, at least until the maximum compression of the O-ring is achieved as controlled by the space available in the annular seat ring receiving chamber.

A primary object of the invention is the provision of a ball valve which is especially adapted for manufacture in small sizes.

Another object is the provision of a ball valve design in which the ball and stem are blowout proof.

A further object of the invention is the provision of a ball valve of the type in which the bearing surfaces of the stem or operating assembly are isolated from the valve chamber so that the bearing surfaces are non-wetted surfaces.

Yet another object is the provision of a ball valve which is capable of bi-directional use and has a floating ball and seat ring arrangement.

BRIEF DESCRIPTION OF THE DRAWINGS

The above and other objects and advantages will become apparent from the following description when read in conjunction with the accompanying drawings wherein.

DESCRIPTION OF A PREFERRED EMBODIMENT

Figure 4:
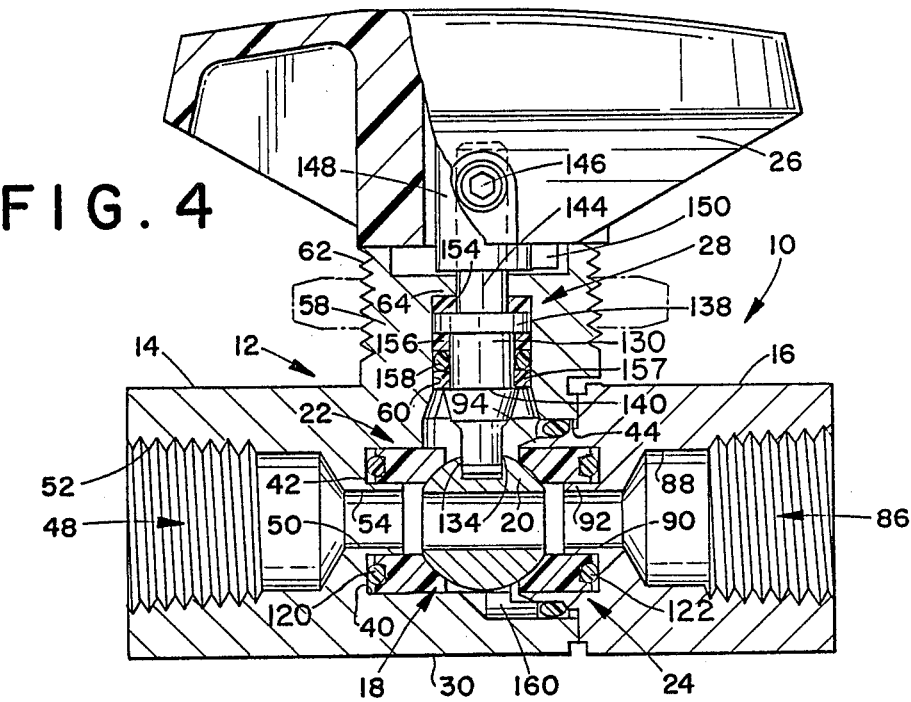
FIG. 4 is a longitudinal cross-sectional view of the valve of FIG. 1.

Referring more particularly to the drawings wherein the showings are for the purpose of illustrating a preferred embodiment of the invention only and not for the purpose of limiting same, FIGS. 1–4 show the overall arrangement of the valve 10 which comprises a housing or body assembly 12 formed of a pair of cooperating first and second body components 14 and 16. As shown in FIG. 4, the body or housing 12 defines a cylindrical, internal valve chamber 18 which carries a rotatably mounted valve element or ball member 20 and cooperating seat or seal assemblies 22 and 24. The ball member 20 is arranged to be rotated between open and closed positions by a handle 26 suitably connected to the ball 20 through a stem assembly 28.

Figure 2:
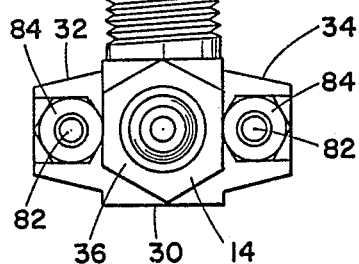
FIG. 2 is an end elevational view of the left-hand end of the valve of FIG. 1.
Figure 3:
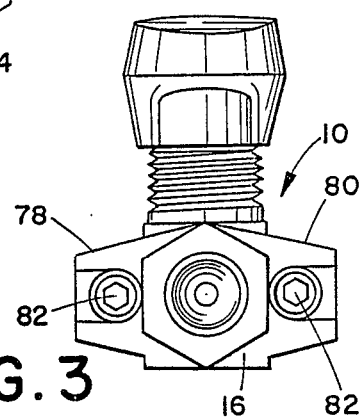
FIG. 3 is an end elevational view of the right end of the valve of FIG. 1.

In particular, as best shown in FIGS. 2 and 4, the first body component 14 includes a generally rectangular first end portion 30 which has a pair of outwardly extending flange sections 32 and 34 formed integrally therewith. A hexagonal-shaped second end portion 36 is axially aligned with the first end portion 30. As best shown in FIG. 4, a generally cylindrical opening 40 extends axially inwardly from the first end of body component 14 and defines the valve chamber 18. The opening 40 terminates in a generally transversely extending end wall 42 defines a first end of valve chamber 18. An enlarged counterbore section 44 is formed about the inlet end of the opening 40 for reasons which will subsequently be described.

Extending axially into the body section 14 from the second end is a cylindrical flow passage 48 which connects with and is axially aligned with the valve chamber 18 as defined by opening 40. The passage includes a reduced diameter inner end portion 50 and a larger diameter outer end portion 52. Means are provided to permit the passage 48 to be connected to fluid flow lines and the like. Obviously, many different types of conventional connecting means could be used. In the subject embodiment, however, the large diameter portion of the flow passage 48 is provided with female pipe threads for this purpose.

Closely surrounding the inner end 50 of passage 48 is a sleeve section 54 which extends axially into the valve chamber 18. The sleeve section 54 in combination with the outer wall of opening 40 defines an axially open annular recess 56.

Formed integrally with the portion 30 of body component 14 is a generally cylindrical bonnet portion 58. In the embodiment under construction, the bonnet portion 58 is provided with external threads 62 to permit the valve to be panel mounted, if desired.

Formed axially through the bonnet portion 58 transversely to the valve chamber 18 is a stem receiving opening 60. The opening 60 opens to the exterior of the body through a radially inwardly extending circular shoulder or flange portion 64.

Body component 16, as best shown in FIGS. 1–4, has a generally hexagonal configuration with a pair of laterally extending flange sections 78 and 80. The flange sections 78 and 80 are generally of corresponding shape to the previously mentioned flange sections 32, 34 of body component 14. The flange sections are provided with aligned openings to allow the body components 14 and 16 to be suitably and releasably interconnected, such as through the use of socket head capscrews 82 as shown. In addition, the flange sections 32 and 34 are provided with recesses sized so as to engage the associated nut members 84 to prevent rotation during tightening of the capscrews 82. Similar recesses are provided on flanges 78 and 80 to receive the heads of the socket head capscrews 82.

Figure 5:
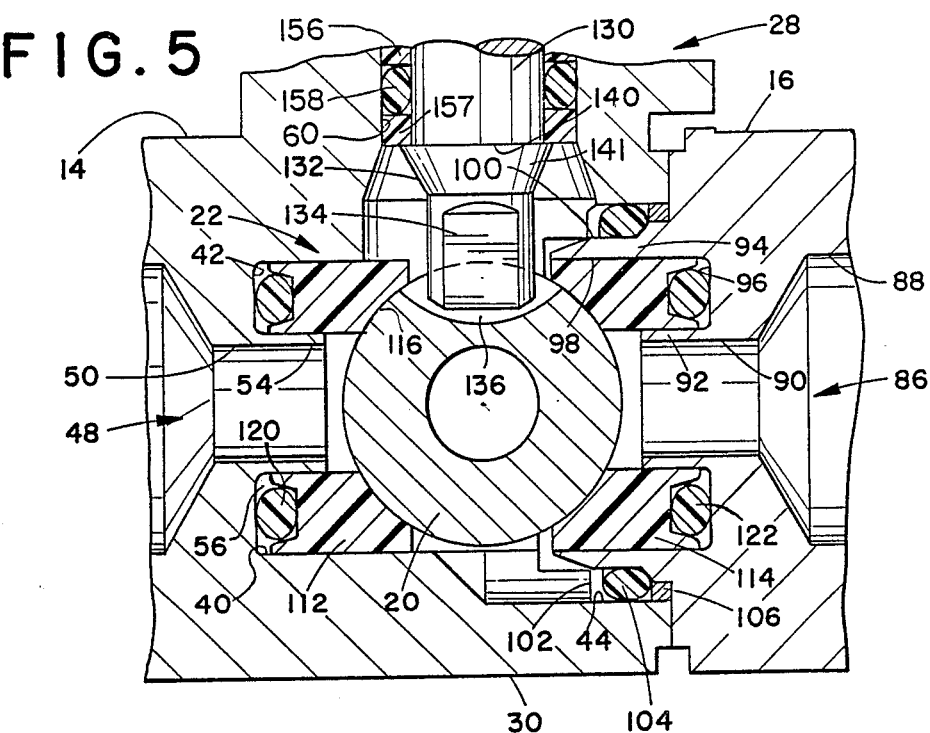
FIG. 5 is an enlarged cross-sectional view of the valve chamber portion of FIG. 4 with the valve element in a closed position; and, FIG. 6 is a view similar to FIG. 5 but showing the valve element moved to its maximum downstream position under the influence of a high upstream pressure.

As best shown in FIGS. 4 and 5, the inner end of body component 16 is arranged to engage with the first end of body component 14 and close the outer end of the valve chamber 18. As shown, the body component 16 includes an axially extending flow passage 86. The flow passage 86 includes a large diameter section 88 and an inner, smaller diameter section 90 which opens axially to the valve chamber 18. In the subject embodiment, the outer end of passageway 86 is provided with female pipe threads for permitting connection of the valve to associated flow lines.

The inner end face of the body component 16 is provided with a pair of radially spaced and circumferentially continuous sleeve sections 92 and 94. The sleeve section 92 is positioned closely about the opening 90 and extends axially of the valve chamber 18 toward the previously mentioned sleeve section 54. The sleeve section 94 is located radially outwardly of the sleeve section 92 and, in combination therewith, defines an axially open annular recess or groove 96 which is aligned with and generally of the same size as the previously mentioned annular opening 40. The inner wall 98 of the sleeve section 94 is preferably located at a diameter corresponding to the diameter of opening 40 which defines the valve chamber 18. The outer wall 100 of the sleeve 94 is spaced radially inwardly of the counterbore 44 of opening 40 to define a circumferentially continuous chamber 102. The mating body components 14 and 16 are sealed by a suitable resilient O-ring 104 positioned in the chamber 102. O-ring blowout is prevented by a back-up ring 106 located in the chamber 102 in engagement with the end face of body component 16.

Of importance to the subject invention is the seat or seal arrangement relative to ball 20. As shown, ball 20 has a central passage 110 which, as is conventional, can be rotated into alignment with the flow passages 48, 86 as shown in FIG. 4 or, rotated 90° to a closed position as shown in FIG. 5. The ball 20 is mounted axially within the valve chamber 18 between opposed seal ring members 112 and 114. In the subject embodiment, the seal rings 112 and 114 are of identical configuration so that only seal ring 112 will be described in detail and the description thereof is to be considered equally applicable to seal ring 114. In particular, as best shown in FIG. 5, seal ring 112 comprises a solid annular body formed from a suitable resilient material, such as polyethylene, "Teflon", or the like depending upon the pressure and/or other environmental conditions to which the seal ring is to be subjected. The ring 112 is sized so as to be closely but slidably received in the recess 56. As shown in FIG. 5, the seal face 116 of the ring 112 is contoured to closely engage the ball 20 and has a radius on the seal face 116 substantially equal to the radius of the ball.

The inner end face of each seat ring 112, 114 is provided with radially inner and outer circumferentially continuous short walls or lips 113. The lips 113 are integral with the body of the respective seat ring and extend axially therefrom. Preferably, the lips are shorter than the normal or uncompressed thickness of the associated O-ring and closely engage the walls of the associated recess on radially opposite sides of the associated O-ring. The function of lips 113 will subsequently be explained in more detail but their primary purpose is to radially confine the associated O-ring and prevent extrusion of the O-ring under high pressure conditions.

As illustrated, the seal ring 112 and the opposed seal ring 114 are both maintained under a bias toward the ball by O-rings 120 and 122 compressed, respectively, between the end faces of the annular recesses 56 and 96 and the associated seal ring. The overall length in an axial direction of the seal rings and the associated O-rings 120, 122 are related to the valve chamber and the ball 20 such that in the position shown in FIG. 5 the rings sealingly engage the ball with a predetermined contact force sufficient to assure sealing under low pressure conditions.

Figure 6:
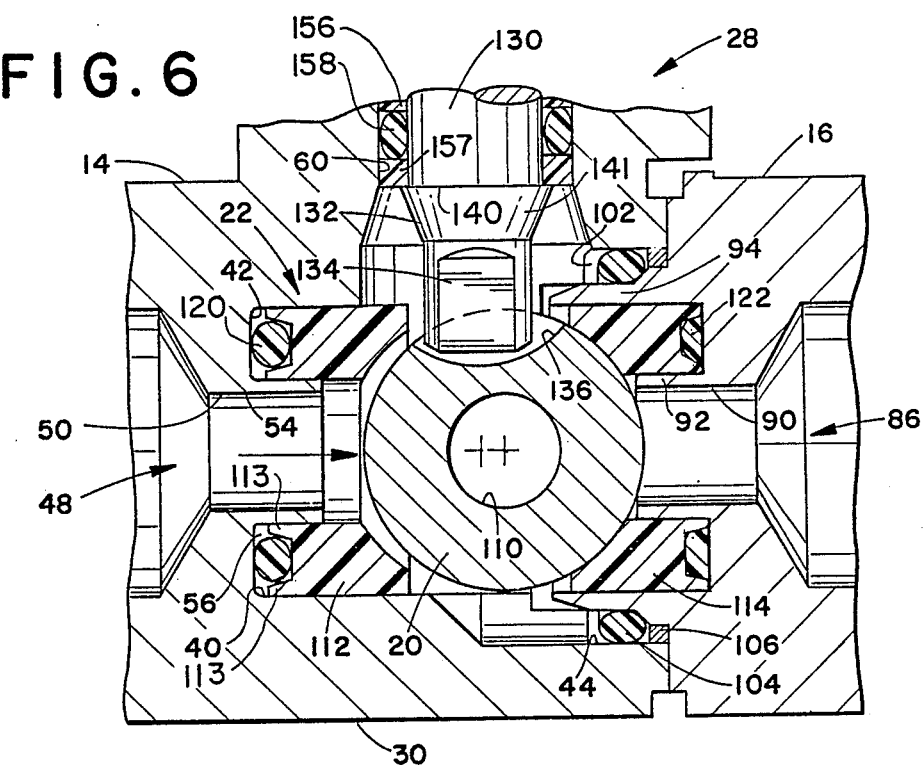

Referring to FIG. 6, the ball and the seal ring relationships under conditions of high pressure are shown. Specifically, the ball 20 is mounted so that it can move axially of the valve chamber in response to high upstream pressure conditions. As shown, with a high pressure present in flow passage 48 the ball 20 is moved toward seal ring 114 increasing the seal pressure between the seal face of ring 114 and the ball. With the increased pressure acting against ring 114 the ring moves into recess 96 compressing O-ring 122. During compression of O-ring 122, the O-ring is confined radially by the lips 113. The compression of the O-ring applies radial forces to the lips 113 causing them to more tightly engage the walls of the recess 96. This relationship prevents extrusion of the O-ring 122 about the seat ring 114.

As compression of the downstream O-ring 114 takes place, the upstream seat ring 112 moves with the ball 20 for a short distance. However, with continued movement of the ball, the seal between seal ring 112 and the ball is broken and the valve chamber area surrounding the ball is subjected to the increased pressure. The O-rings 120 and 122 are related to the available space in their respective recesses 56 and 96 such that the maximum movement permitted by the associated seat ring is such that contact cannot take place between the ball and the inner sleeve sections 54 and 92.

It is important to note that the seal rings 112 and 114 are substantially fully confined and enclosed about both their inner and outer surfaces when they are in their maximum load conditions. By so confining the seat rings, cold flow and distortion of the seal ring at the downstream end under high pressure conditions is eliminated. The forces acting on the seats are thus substantially pure compression load which the materials from which such seats are formed can withstand better than bending or tension. It should also be noted that both the seals, the O-rings, and the ball seat cavities are identical and the valve is therefor bi-directional. That is, it can be used with either of the flow passages 48 or 86 serving as the upstream or inlet passage. When flow passage 86 is the inlet passage, the ball 20 moves toward seat ring 112 under high pressure conditions in the same manner as previously discussed with respect to seat ring 114 when passage 48 is serving as the inlet.

A further feature of importance to the subject invention is the overall construction and arrangement of the stem assembly 28. As previously discussed, stem assembly 28 is arranged to be blowout proof in that the stem and related elements are totally confined within the valve body by the previously mentioned flange 64. Additionally, the assembly provides non-wetted bearing surfaces for the stem.

Specifically, as best shown in FIGS. 4-6, stem assembly 28 includes a unitary, one-piece stem member 130 having a reduced diameter lower end portion 132. Portion 132 is provided with a pair of oppositely facing flats 134 which are freely received in an arcuate, flat sided groove 136 formed in the ball 20. As shown in FIGS. 4 and 5, the recess or groove 136 is arranged to provide a driving connection between the stem 130 and the ball 20 while permitting the ball to be free to move in the downstream direction under the influence of high upstream pressures. For this reason, groove 136 is formed to extend generally transversely to the ball passage 110.

Stem 130 further includes a radially extending integral flange 138. Flange 138 has a diameter only slightly less than the diameter of opening 60. Also carried on stem 130 is a radially extending shoulder 140. Preferably the upper surface of shoulder 140 extends generally perpendicular to the axis of stem 130, while the lower surface is tapered as shown. The relationship between flange 138, shoulder 140 and the flange 64 on the upper end of opening 60 provides enclosed entrapment chambers for the bearing and seal elements which will subsequently be described.

As best shown in FIG. 4, the upper end of stem 130 has a reduced diameter portion 144 which extends outwardly through flange 64 to the exterior of the body component 14. Handle 26 is connected to the upper end of the stem portion 144 in any convenient manner such as through the use of a setscrew 146.

Figure 1:
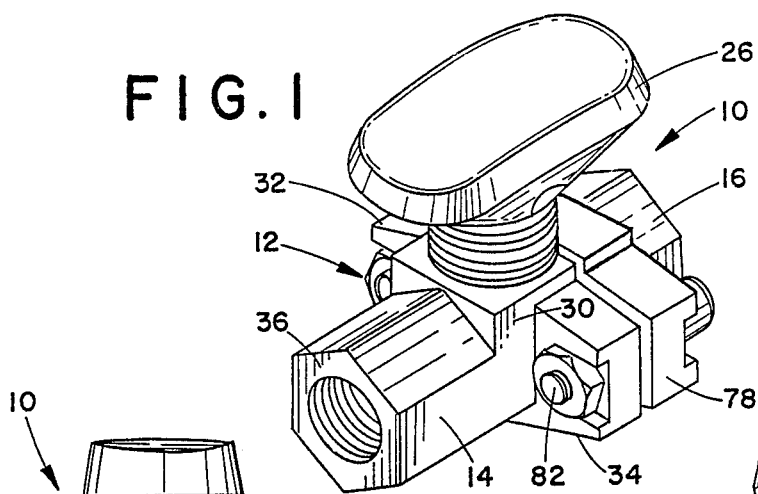
FIG. 1 is a pictorial view of a ball valve incorporating the subject invention.

In the embodiment under consideration, handle 26 is molded from plastic and has a generally oval, elongated configuration best shown in FIG. 1. The oval configuration provides a readily visible indication of valve position. Preferably, the handle 26 includes a metal insert member 148 which is molded into the plastic of the handle body. Preferably, the insert 148 includes an integral stop portion 150 which is arranged to engage suitable stop surfaes (not shown) formed in the outer end of bonnet portion 58. Also, the insert 148 of the subject embodiment has opposed flats on its sides such that if the handle is broken or shattered the valve could be operated by applying a wrench to the insert.

Referring again to the operating stem assembly 28 and as best shown in FIG. 4, the stem member 130 is sealed and guided by resilient rings 154, 156, and 157, and an O-ring 158. Ring 154 is captured between the upper stem flange 138 and the shoulder 64. This ring is preferably made from a relatively stiff but resilient material such as a filled Teflon or the like. Rings 156 and 157 are positioned beneath flange 138 on opposite sides of O-ring 158. The spacing between the underside of flange 138 and shoulder 140 is related to the total thickness of rings 156, 157 and 158 so as to provide a slight precompression on O-ring 158.

The main guiding and bearing surfaces for the stem 130 are provided by rings 154 and 156. The placement of O-ring 158 at the location shown allows the bearing and guide surfaces provided by rings 154 and 156 to be non-wetted surfaces and isolated from the fluid within the valve chamber.

Because the stem 130 is totally captured within the opening 60 and is not held therein by threaded or bolted connections, the valve is generally considered to be blowout proof. In addition, because of the arrangement of the stem it must be assembled from the exterior of body component 14 by being inserted into the bore 44 from the outer end thereof prior to attachment of body component 16. Because of the overall length of the stem 130 and the diameter of opening 40, the body component 14 is provided with a relief area or cutout 160 which provides a space for the insertion of stem 130.

The invention has been described with reference to the preferred embodiment. Obviously, alterations and modifications will occur to others upon a reading and understanding of this specification. It is intended to include all such alterations and modifications insofar as they come within the scope of the appended claims or the equivalents thereof.

Having thus described the invention, it is now claimed:

1. A ball valve comprising:
 a first unitary body member having first and second axially disposed ends with a cylindrical valve chamber extending inwardly from the first end thereof and terminating in a transversely extending end face, a first flow pasage extending into said first body member from said second end and opening into said valve chamber axially of said end face, a first sleeve member formed about said first flow passage and extending axially into said valve chamber and defining an axially extending recess, a cylindrical stem receiving chamber extending radially outwardly from said valve chamber and opening to the exterior of said first body member through an inwardly facing shoulder;
 a secondary unitary body member releasably connected to the first end of said first body member to close the first end of said valve chamber and define a second flow passage opening into said valve chamber in axial alignment with said first flow passage, inner and outer radially spaced sleeves formed integrally with said second body member and extending into said valve chamber circumferentially about said second flow passage and defining an axial recess opening into said valve chamber, said inner sleeve being aligned with said first sleeve member formed about said first flow passage on said first body member, said outer sleeve forming a continuation of said valve chamber and having an inner diameter substantially corresponding to the diameter of said valve chamber;
 a valve ball mounted in said valve chamber in axial alignment with said first and second flow passages;
 seat rings positioned about said first and inner sleeve members and biased into engagement with said valve ball by O-rings carried in said recesses;
 an operating stem for rotating said ball, said operating stem positioned axially of said stem receiving chamber and having an outer end portion extending past said inwardly facing shoulder, and a flange extending outwardly of said stem at a location axially inwardly of said inwardly facing shoulder with a resilient bearing ring located between said flange and said shoulder;
 a stem shoulder carried on said stem axially inwardly of said flange; and
 stem seal means located between said flange and said stem shoulder.

2. A ball valve as defined in claim 1 including a seal ring located between said outer sleeve and said first body member.

3. A ball valve as defined in claim 1 wherein said valve chamber has an enlarged counterbore formed at the first end thereof, said counterbore sized to receive said outer sleeve of said second body member and define an annular space between said outer sleeve and said first body member.

4. A ball valve as defined in claim 3 wherein said first and second body members are sealed by a seal ring located in said annular space.

5. A ball valve as defined in claim 1 wherein said stem seal mean comprise a pair of ring members closely engaged with the walls of said stem receiving chamber.

6. A ball valve as defined in claim 1 wherein said stem is maintained in an outer position by a handle member releasably joined to the outer end of said stem.

7. The ball valve as defined in claim 1 wherein said O-rings are compressed by axial movement of the valve ball in a direction toward their associated inner sleeve member, the total volume of said seat rings being related to the volume of their respective recesses to limit compression of the O-rings to a point such that contact between the ball member and the associated inner sleeve cannot take place.

8. The valve of claim 1 wherein seat rings each include a first end engaged with the associated O-ring, a pair of relatively short lip members located on the first end of each seat ring, each lip member extending axially of the seat rings into the associated recess on radially opposite sides of the associated O-ring; and each said lip member being radially confined by the walls of the associated recess and confining the associated O-ring.

* * * * *